United States Patent [19]
Goto et al.

[11] Patent Number: 5,408,842
[45] Date of Patent: Apr. 25, 1995

[54] AIR-CONDITIONING APPARATUS FOR ELECTRIC VEHICLE

[75] Inventors: Naomi Goto, Shiga; Makoto Yoshida; Masafumi Nishimiya, both of Kusatsu, all of Japan

[73] Assignee: Matsushita Electric Industrial Co., Ltd., Osaka, Japan

[21] Appl. No.: 228,016

[22] Filed: Apr. 15, 1994

[30] Foreign Application Priority Data

Apr. 21, 1993 [JP] Japan .................................. 5-094021

[51] Int. Cl.⁶ .............................................. B60H 1/00
[52] U.S. Cl. ......................................... 62/230; 62/243; 318/801
[58] Field of Search .................... 62/203, 323.3, 243; 318/801, 803; 363/109, 110; 323/901; 307/31, 33, 10.1, 10.7, 109

[56] References Cited

U.S. PATENT DOCUMENTS

| | | | |
|---|---|---|---|
| 3,940,669 | 2/1976 | Tsuboi et al. | 318/801 X |
| 4,227,139 | 10/1980 | Rosink et al. | 318/803 |
| 4,482,854 | 11/1984 | Kawada et al. | 318/801 |
| 5,179,842 | 1/1993 | Kanazawa | 62/230 X |

*Primary Examiner*—Harry B. Tanner
*Attorney, Agent, or Firm*—Stevens, Davis, Miller & Mosher

[57] ABSTRACT

An electric-vehicle air-conditioning apparatus small in size, simple in construction and high in reliability, which can be used for many types of vehicles, includes a battery, a conducting device connected in series with the battery, a switching device connected in parallel to the conducting device, a capacitor charged from the battery through the conducting device, a device supplied with power from the battery through the switching device for driving an electrically-operated air-conditioning compressor. The conducting device is adapted to charge the capacitor with a constant current.

2 Claims, 8 Drawing Sheets

CURRENT SUPPLIED FROM BATTERY TO COMPRESSOR DRIVING MEANS

CURRENT SUPPLIED FROM BATTERY TO COMPRESSOR DRIVING MEANS WITH CAPACITOR CONNECTED

SURGE VOLTAGE DUE TO RESONANCE

BATTERY VOLTAGE

AIR-CONDITIONING APPARATUS FOR ELECTRIC VEHICLE

BACKGROUND OF THE INVENTION

1. Field of the Invention

The present invention relates to an air-conditioning apparatus for the electric vehicle having a compressor driven by the electric power supplied from a battery.

2. Description of the Related Art

In an air-conditioning apparatus for the electric vehicle, the device for driving an electrically-operated compressor for air-conditioning purposes supplies a large current to the electrically-operated compressor. Therefore, the large electric noise interferes with the car radio, and the large current fluctuations adversely affects the durability of the battery for supplying the current. As a result, it is necessary, as shown in the current waveform diagrams of FIG. 5(a) and (b), to smooth the current supplied to the electrically-driven compressor thereby to suppress the electric noise and current fluctuations. For this purpose, a capacitor of large electrostatic capacity is provided at a point where the electrically-operated compressor driving means is supplied with electric power through a switching device from the battery.

The provision of a capacitor with a large electrostatic capacity, however, causes a large charge current to flow to the capacitor on the instant the battery is connected. The resulting problem is that the fuse blows out or the pattern wiring of the printed board is broken, or a surge current is generated by the resonance with the inductance component of the wiring from the battery as shown by the waveform diagram of FIG. 5(c), thereby damaging the electrically-operated compressor driving means.

In order to suppress the charging surge current to the capacitor on the instant the battery is connected, the capacitor is charged through a conducting device. Normally, a resistor is used as the conducting device.

The operation of a conventional air-conditioning apparatus for the electric vehicle will be explained with reference to the circuit diagram of FIG. 7 showing a conventional air-conditioning apparatus for the electric vehicle and the circuit operation diagram for the air-conditioning apparatus for the electric vehicle shown in FIG. 8. With the battery 2 connected, the voltage Vc of the capacitor 11, the current Ir of the resistor 8 and the current Ic of the capacitor 11 are determined as shown in FIG. 8 from the time constant based on the resistance value of the resistor 8 and the electrostatic capacity of the capacitor 11. When the capacitor 11 is charged and input voltage detector means 7 detects a voltage of more than a predetermined value, a controller 6 closes the switching device 3, and power is supplied through the switching device 3 from the battery, thereby causing the electrically-operated compressor driving device to drive the electrically-operated air-conditioning compressor.

The resistance value of the resistor 8 is required to be sufficiently large to suppress the charging surge current as described above. On the other hand, the resistance value of the resistor 8 must be small enough to blow out the fuse at the time of a malfunction such as the damage to the electrically-operated compressor driving device or the shortening of the capacitor. The value of the fuse is about 10 A to blow out positively at the time of a malfunction. The resistance value of the resistor 8 becomes 7.5 ohm if the voltage across the battery 2 is 300 V to assure current flow of 40 A to blow out the fuse positively at the time of a malfunction. When the battery 2 is connected, therefore, the current of about 40 A flows, the subsequent current being determined by the time constant. The larger the electrostatic capacity of the capacitor 11, the larger the time constant, thereby increasing the power consumption of the resistor 8 accordingly. The electrostatic capacity of the capacitor 11 normally assumes a large value of about 1000 $\mu$F for smoothing the current. At the time of connecting the battery 2, the instantaneous maximum power consumption of the resistor 8 is 300 V$\times$40 A=12,000 W. A large-power resistor 8 must therefore be used to maintain the reliability thereof. According to the guaranteed specification of the resistor 8, the resistor 8 is a rated product of about 60 W.

As seen from FIGS. 6A and 6B showing the form of the resistor, a large space is required for the controller of the vehicle air-conditioning apparatus even when two 30 W resistors instead of a 60 W resistor are used.

In the case where the electrically-operated compressor driving device or capacitor is in a minor trouble such as when the current of 9 A flows with the fuse not blown out, the resistor 8 consumes large electric power of (9 A)2$\times$7.5 ohm=607.5 W, thereby compromising the reliability due to the smoking, solder melting or wiring damage due to overheating.

In the case where a resistor is used as a conducting device as described above, such a resistor must be a large-power item of about 60 W. The large-power resistor, due to the large size, can not be directly connected on the printed circuit board in the electrically-operated compressor driving device, and requires a considerable space to be secured for mounting, thereby leading to a bulky air-conditioning apparatus. The air-conditioning apparatus for the electric vehicle must be installed in a limited space in the vehicle, and therefore must be as small as possible. A conducting device is required which does not cause an increased size of the air-conditioning apparatus.

In the case where a resistor is used as a conducting device, a wiring is required of the resistor, and further the wiring must be fixed in order not to be damaged by contact with a heat generating material or a metal edge. The resulting complicated and bulky structure of a conducting device makes fabrication difficult.

Also, the resistance value of the resistor is required to be sufficiently large to suppress the charging surge current. On the other hand, the resistance value must be small enough to allow the fuse to blow out when the electrically-operated compressor driving device is damaged or the capacitor is shorted. The resistance value of the resistor, therefore, must be changed in accordance with the battery voltage or the electrostatic capacity of the capacitor. Since the battery voltage of the electric vehicle is so varied and the capacity required of the air-conditioning apparatus varies from one vehicle to another, different amounts of current are supplied to different electrically-operated compressors. It is therefore necessary to change the resistance value of the resistor for different air-conditioning apparatuses or vehicles, with the result that an increased number of types of air-conditioning apparatus complicates the production control, often raising the problem of an increased cost or other production-related problems.

Also, when the electrically-operated compressor driving device or the capacitor is in minor trouble with the fuse not blown out, the resistor consumes large electric power for a reduced reliability due to overheat. As a result, the measure taken for heat radiation undesirably increases the size of the air-conditioning apparatus.

Further, the capacitor, when connected in reverse polarities, is "punctured" to damage the apparatus. When a switching power supply is connected in parallel to the capacitor, a sharp voltage increase may damage the switching power circuit.

SUMMARY OF THE INVENTION

Accordingly, it is an object of the present invention to provide an air-conditioning apparatus for the electric vehicle small in size, simple in construction and high in reliability, which can be used for a multiplicity of types of batteries and vehicles.

According to a first aspect of the invention, there is provided an air-conditioning apparatus for the electric vehicle, comprising a battery having first and second terminals, a conducting device having an input terminal connected to the first terminal of the battery and an output terminal and for generating a constant current from an output terminal when a voltage between the input and output terminals is higher than a predetermined value, switching means connected in parallel to the conducting device and for shorting the input and output terminals of the conducting device in accordance with a control signal, a capacitor connected between the output terminal of the conducting device and the second terminal of the battery and adapted to be charged through the conducting device from the battery, and means for driving an electrically-operated air-conditioning compressor including first means connected in parallel to the capacitor and for detecting the voltage across the capacitor to produce the control signal for causing the switching means to short when the detected voltage exceeds a predetermined value and second means for driving the electrically-operated air-conditioning compressor by use of electric power supplied from the battery through the switching means.

According to a second aspect of the invention, there is provided an air-conditioning apparatus for the electric vehicle, comprising a battery having first and second terminals, conducting means having an input terminal connected to the first terminal of the battery and an output terminal and for generating a current from the output terminal when a voltage between the input and output terminals is higher than a first predetermined value, the conducting means further including means for increasing the current until the voltage between the input and output terminals decreases to a second predetermined value, switching means connected in parallel to the conducting means and for shorting the input and output terminals of the conducting means in accordance with a control signal, a capacitor connected between the output terminal of the conducting means and the second terminal of the battery and adapted to be charged through the conducting means from the battery, and means for driving an electrically-operated air-conditioning compressor including first means connected in parallel to the capacitor and for detecting the voltage across the capacitor to produce the control signal for causing the switching means to short when the detected voltage exceeds a predetermined value and second means for driving the electrically-operated air-conditioning compressor by use of electric power supplied from the battery through the switching means.

In the electric-vehicle air-conditioning apparatus according to the first aspect of the invention, conducting means charges a capacitor with constant current. As a result, a constant current can be supplied regardless of the battery voltage or the electrostatic capacity of the capacitor. If the constant current value is set small, the charging surge current does not flow, so that the current is maintained at a predetermined value when the electrically-operated compressor driving means is damaged or the capacitor is shorted or otherwise the apparatus is in minor trouble. The overheating is thus prevented even though the fuse fails to blow out. It is thus possible to share the use of the conducting means regardless of the battery voltage or the electrostatic capacity of the capacitor. Also, if the conducting means is made up a semiconductor with a constant current set to a small value, a small-sized semiconductor is usable and the direct connection of the conducting means is possible on the printed circuit board in the electrically-operated compressor driving means. This eliminates the need of a large space and reduces the size of the air-conditioning apparatus. Further, since the wiring is not required, the work is not needed for fixing the wiring to prevent the wiring damage which otherwise might be caused by contact with a heat generating material or a metal edge. The construction of the conducting means is thus simplified thereby to facilitate production thereof. Furthermore, even if the capacitor is connected reversely, the smallness of the current reduces the heat generation and therefore no puncture occurs. The slow rate of voltage increase of the switching power supply does not cause a circuit breakdown.

In the electric-vehicle air-conditioning apparatus according to the second aspect of the invention, the conducting means increases the charge current to the capacitor at a slow rate. This prevents the charging surge current from flowing. Also, if the maximum current is set to a small value, the current is maintained at the small maximum value, thereby preventing an overheating even though the fuse is not burnt out, at the time of malfunction such as damage to the electrically-operated compressor driving means or the shorting of the capacitor or other minor troubles. Also, in the beginning of charging operation when a substantially full battery voltage is applied to the conducting means, the power consumption and hence heat generation of the conducting means is small due to a small charge current. The subsequent drop in voltage and rise in current averages out both the power consumption and heat generation of the conducting means to a small value without any considerable variations. As a consequence, the heat radiation of the conducting means is so small that the current rating of the device is reduced, thereby making it possible to reduce both the size and cost thereof. Further, if the conducting means is composed of a semiconductor with the maximum current set to a small value, a small-sized semiconductor is usable and therefore the conducting means can be connected directly on the printed circuit board in the electrically-operated compressor driving means. The resulting reduced space reduces the size of the air-conditioning apparatus. Furthermore, since the wiring is not required, the work is eliminated for fixing the wiring which otherwise might be needed for preventing wiring damage by contact with the heat generating material or a metal edge. The conducting means can thus be simplified in construction and is easy to fabricate. In addition, even if the capacitor is connected in reverse direction, the small current value reduces the heat generated by the capacitor and prevents puncture. Also, the gradual voltage increase of the switching power supply causes no circuit breakdown.

DESCRIPTION OF THE PREFERRED EMBODIMENTS

An embodiment of the invention will be explained below with reference to the accompanying drawings.

Figure 1:
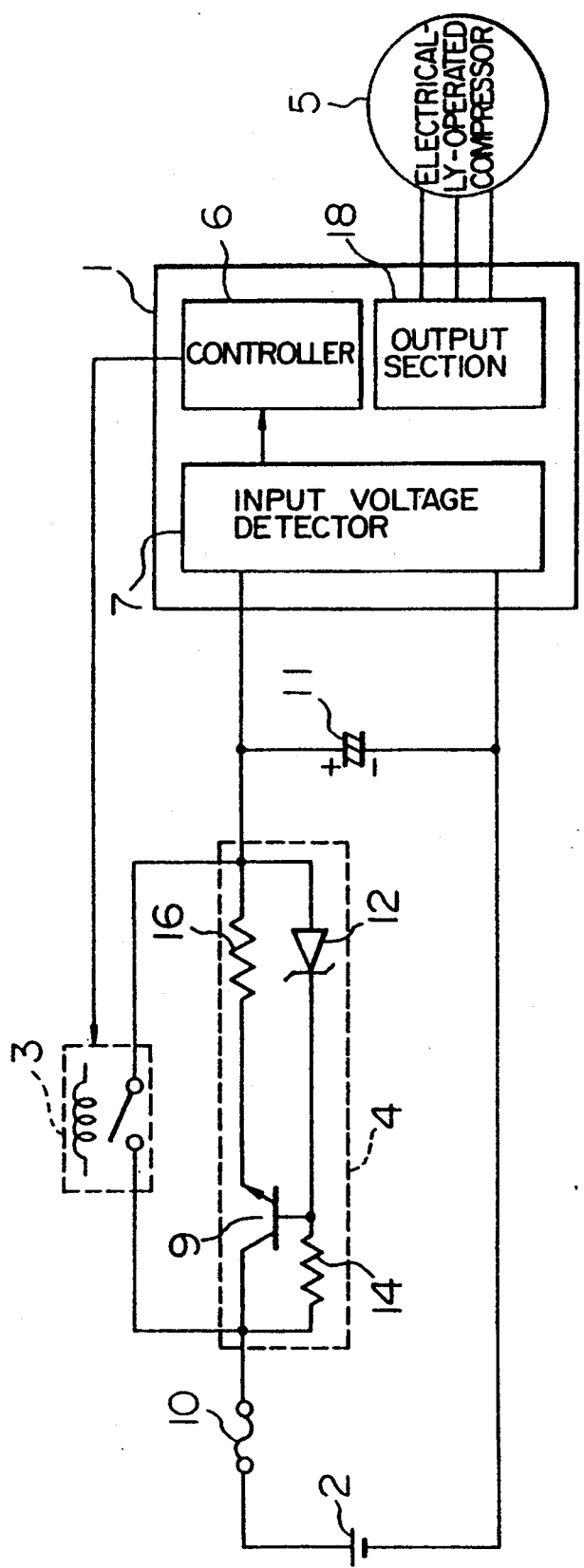
FIG. 1 is a circuit diagram showing an air-conditioning apparatus for the electric vehicle according to a first embodiment of the present invention.
Figure 2A:
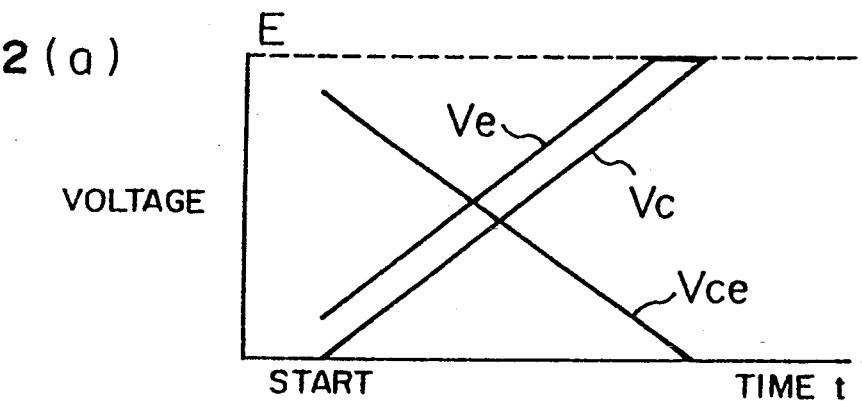
FIG. 2 shows the circuit operation according to the first embodiment of the invention, in which (a) is a diagram showing the voltage change across a capacitor and a transistor, (b) the voltage change across a resistor, (c) the change in emitter current, and (d) the change in collector loss.
Figure 2B:
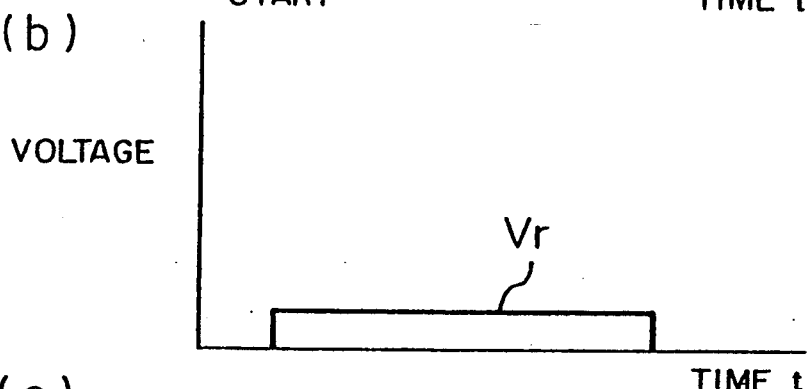
Figure 2C:
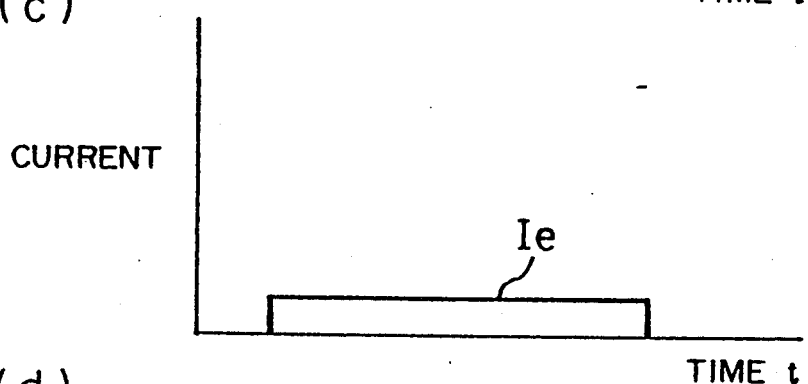
Figure 2D:
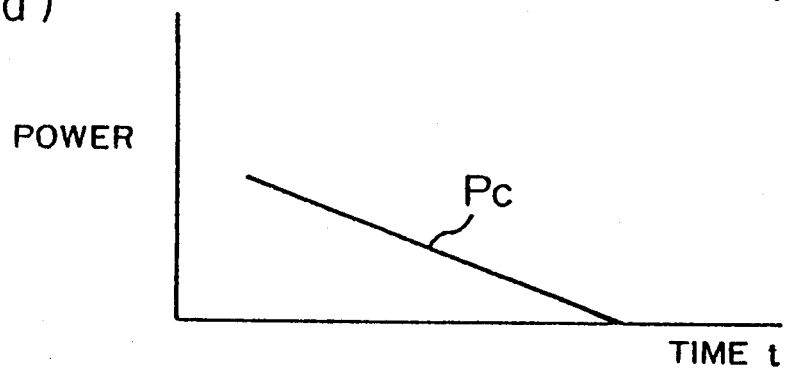
Figure 7:
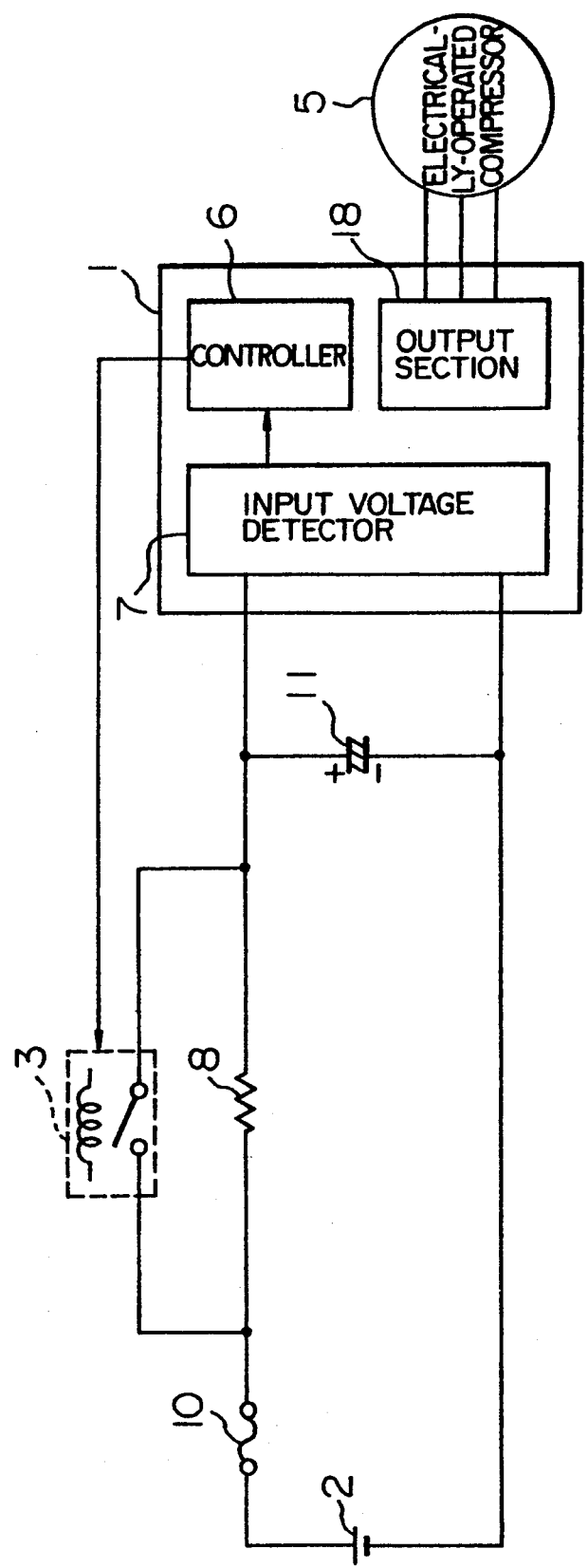
FIG. 7 is a circuit diagram showing a conventional electric-vehicle air-conditioning apparatus.
Figure 8:
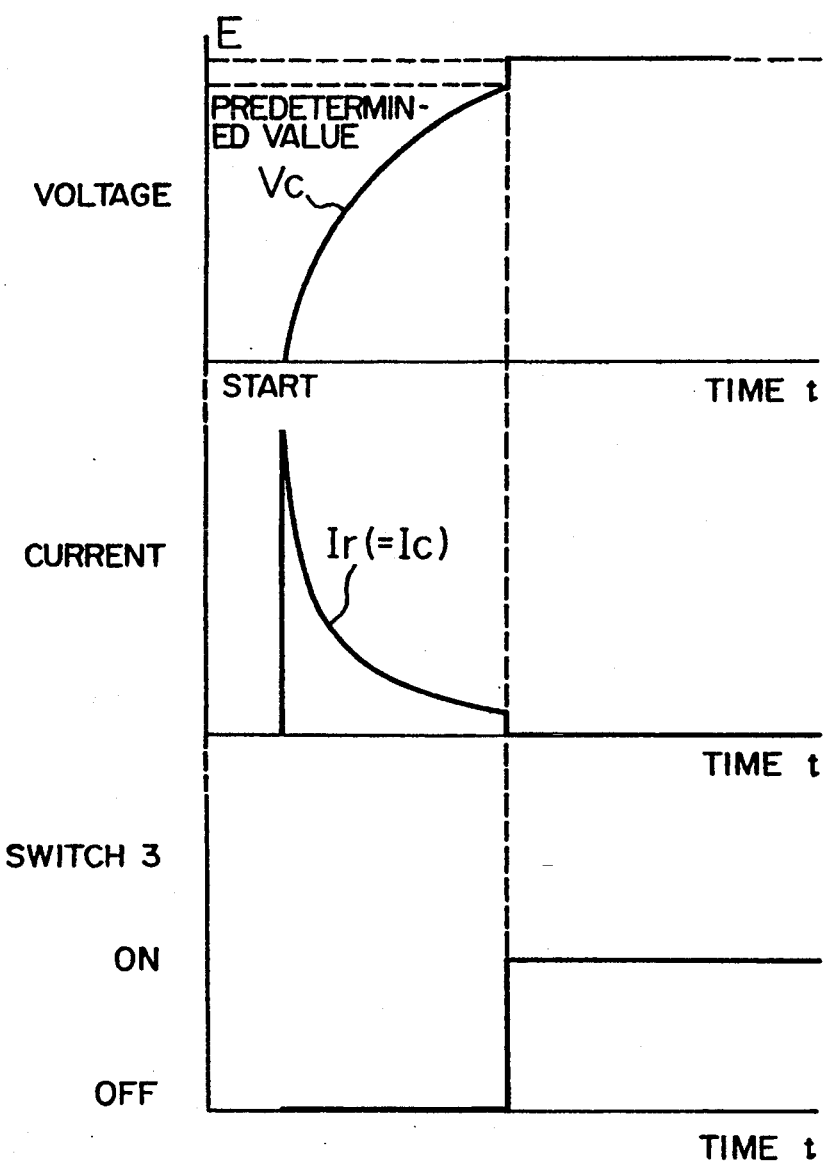
FIG. 8 is a diagram showing the circuit operation of a conventional electric-vehicle air-conditioning apparatus.

A circuit diagram of an electric-vehicle air-conditioning apparatus according to a first embodiment of the invention is shown in FIG. 1. This circuit diagram is different from that of a conventional electric-vehicle air-conditioning apparatus shown in FIG. 7 in that the conducting means for the prior art is a resistor while a constant-current circuit is used according to the first embodiment of the invention. This constant-current circuit includes an output transistor 9, a zener diode 12, a base resistor 14 and an emitter resistor 16.

The operation of the circuit will be explained. When the battery 2 is connected, a voltage is applied to the base resistor 14 and the collector of the output transistor 9 through a fuse 10. The base of the output transistor 9 is impressed with a voltage through the base resistor 14, and therefore the base current flows through the emitter resistor 16 to a capacitor 11. As a result, the emitter current Ie commensurate with the current amplification factor of the output transistor 9 flows from the emitter of the output transistor 9 through the emitter resistor 16 to the capacitor 11. The emitter current Ie and the base current thus flow in the emitter resistor 16, so that a voltage is generated which is positive on the side of the output transistor 9 and negative on the side of the capacitor 11. The emitter of the output transistor 9, the base of the output transistor 9, the cathode of the zener diode 12 and the anode of the zener diode 12 are connected in that order in series across the emitter resistor 16. When the voltage described above is about to exceed the zener voltage of the zener diode 12 minus the base-emitter voltage of the output transistor 9, the base voltage of the output transistor 9 decreases thereby to reduce the base current since the base voltage of the output transistor 9 is clipped by the zener voltage of the zener diode 12. The emitter current Ie thus decreases also. Consequently, the voltage described above cannot exceed the zener voltage of the zener diode 12 minus the base-emitter voltage of the output transistor 9. Also, when the voltage described above is about to decrease below the zener voltage of the zener diode 12 minus the base-emitter voltage of the output transistor 9, the base voltage of the output transistor 9 increases for an increased base current in view of the fact that the base voltage of the output transistor 9 is clipped by the zener voltage of the zener diode 12. The emitter current Ie thus increases also. As a consequence, the voltage described above cannot decrease below the zener voltage of the zener diode 12 minus the base-emitter voltage of the output transistor 9.

Due to the above-mentioned operation, the circuit operation is stabilized with the voltage across the emitter resistor 16 coinciding with the the zener voltage of the zener diode 12 minus the base-emitter voltage of the output transistor 9. Thus the sum of the emitter current Ie and the base current (which substantially equals the emitter current Ie) assumes the value of the zener voltage of the zener diode 12 minus the base-emitter voltage of the output transistor 9, divided by the resistance value of the emitter resistor 16. The zener voltage, the base-emitter voltage and the resistance value are all fixed, and therefore the value calculated above is fixed and represents a constant current.

The aforementioned operation is shown in FIG. 2 which is the circuit operation diagram according to the first embodiment of the invention. The voltage Vc across the capacitor 11 is zero in the beginning when the battery 2 is connected, but linearly increases as it is charged with a constant current. The emitter voltage Ve of the output transistor 9 assumes the value of the zener voltage of the zener diode 12 minus the base-emitter voltage of the output transistor 9 in the beginning since a constant current flows in the emitter resistor 16 from the beginning. Subsequently, the emitter voltage Ve assumes a value equal to the sum of the voltage Vc across the capacitor 11 and the difference between the zener voltage and the base-emitter voltage. The voltage Vr across the emitter resistor 16 assumes the value of the zener voltage minus the base-emitter voltage from the beginning. The collector-emitter voltage Vce of the output transistor 9 assumes the voltage E across the battery 2 minus the emitter voltage Ve of the output transistor 9, and the collector-emitter voltage Vce linearly decreases. The emitter current Ie of the output transistor 9 assumes a fixed value equal to the voltage Vr across the emitter resistor 16 divided by the resistance value of the emitter resistor 16. The collector loss Pc of the output transistor 9 is the product of the collector-emitter voltage Vce and the emitter current Ie, and the collector-emitter voltage Vce linearly decreases. The emitter current Ie, which is a fixed value, also linearly decreases.

Figure 6A:
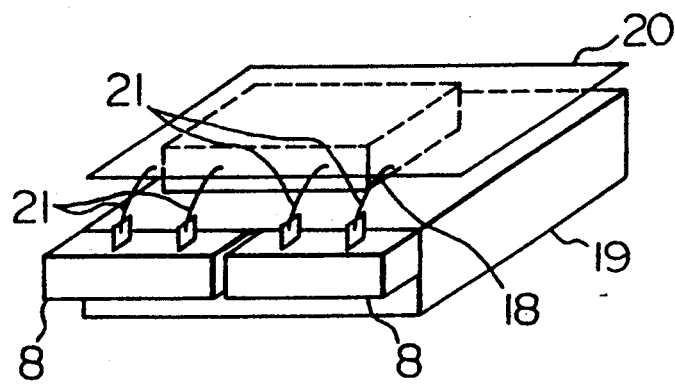
FIGS. 6A and 6B are perspective views showing a resistor in the circuit of FIG. 7, and FIGS. 6C and 6D perspective views showing the shape of a transistor for an electric-vehicle air-conditioning apparatus according to the present invention.
Figure 6B:
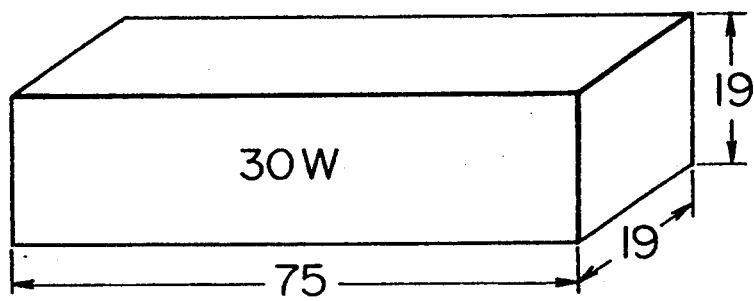
Figure 6C:
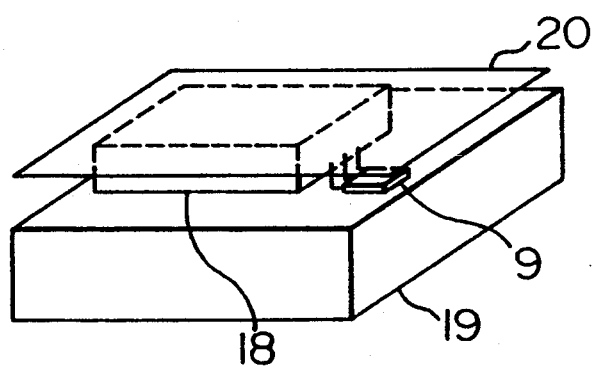
Figure 6D:
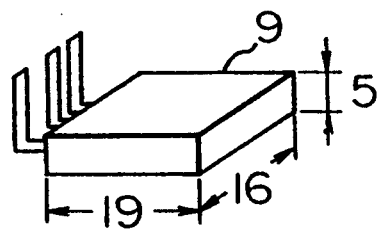

According to the embodiment under consideration, the capacitor 11 is charged through a conducting circuit 4 having a constant-current characteristic instead of through a resistor. The constant current value is decided in that the zener voltage of the zener diode 12 minus the base-emitter voltage of the output transistor 9 is divided by the resistance value of the emitter resistor 16. This value can be arbitrarily set by selecting the zener voltage of the zener diode 12 and the resistance value of the emitter resistor 16 appropriately. Assuming that the zener voltage is 8 V and the resistance value is 70 ohms (with the base-emitter voltage of 1 V), the constant current value is 0.1 A. As a result, only the current of 0.1 A far smaller than 40 A flows from the time point when the battery 2 is connected. Also, the power consumption of the emitter resistor 16, which is 0.7 W, can be accommodated by the use of a resistor of 1 W which is much smaller than the 60 W. The current of 0.1 A flows in the case of damage to the electrically-operated compressor driving means or such a malfunction as shorting of the capacitor or other minor troubles. Therefore, the fuse fails to burn out, but the collector loss Pc of the output transistor 9 is at most 30 W, or the product of 300 V and 0.1 A, that is, 15 W on the average. As a consequence, as seen from FIGS. 6C and 6D showing the shape of the transistor, the output transistor 9 can be cooled sufficiently if mounted on a heat sink 19 for the output section 18. Also, the constant current value is so small that a small transistor is usable and connectable directly on the printed circuit board. A large space is not required and the air-conditioning apparatus can be reduced in size. Further, the absence of wiring eliminates the need of the work for fixing the wiring and facilitates the production. Furthermore, the constant-current value is determined regardless of the battery voltage or the electrostatic value of the capacitor in the aforementioned circuit, and therefore conducting means of the same type can be used by a plurality of apparatuses.

Figure 3:
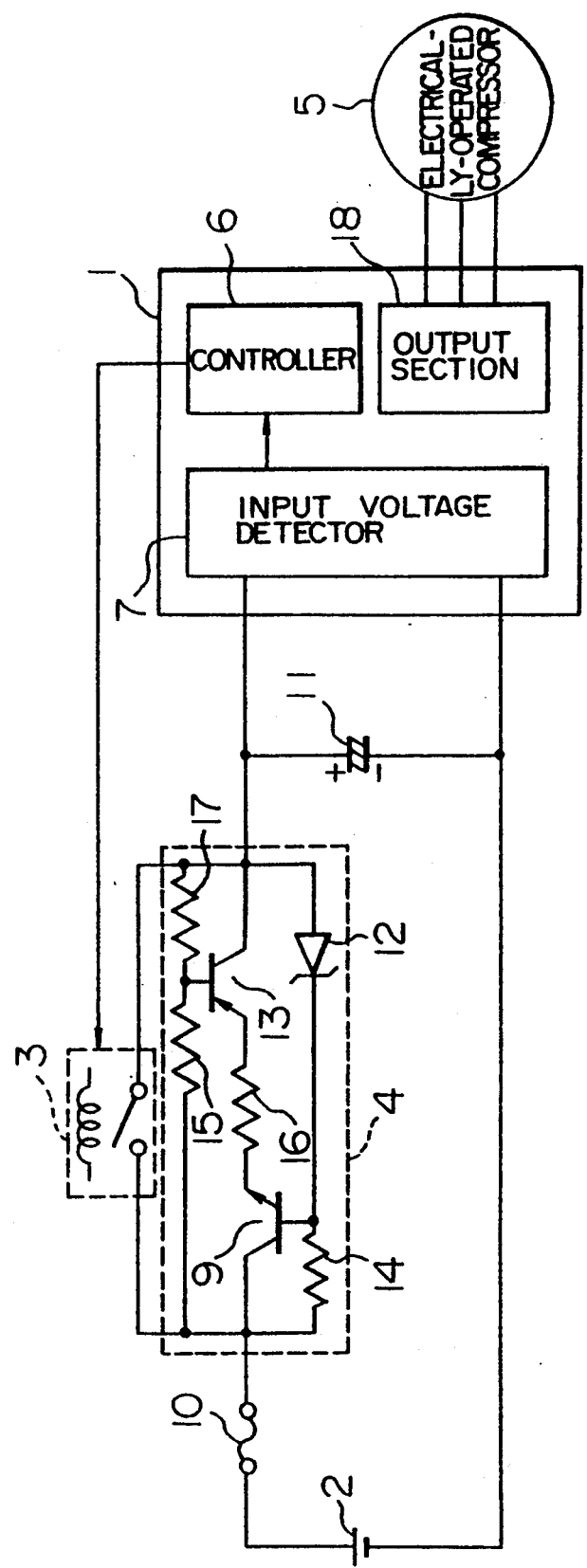
FIG. 3 is a circuit diagram showing an air-conditioning apparatus for the electric vehicle according to a second embodiment of the invention.

A circuit diagram of an electric-vehicle air-conditioning apparatus according to the second embodiment of the invention is shown in FIG. 3. This embodiment is different from the first embodiment of the invention in that the embodiment under consideration further comprises a control transistor 13, a base resistor 15 and a base resistor 17.

The circuit operation will be explained. The concept based on the first embodiment shows that in the circuit of FIG. 3, the circuit operation settles when the voltage across the emitter resistor 16 comes to coincide with the zener voltage of the zener diode 12 minus the emitter-collector voltage of the output transistor 9 further minus the emitter-collector voltage of the control transistor 13. The emitter-collector voltage of the control transistor 13 is equal to the voltage across the base resistor 17, which is obtained in that the difference E-Vc between the voltage E across the battery 2 and the voltage Vc across the capacitor 11 is divided by the base resistor 15 and the base resistor 17, plus the emitter-base voltage of the control transistor 13. The difference E-Vc between the voltage E across the battery 2 and the voltage Vc across the capacitor 11 is equal to E in the beginning of charging operation and assumes zero at the end of charging. As a result, the emitter-collector voltage of the control transistor 13 assumes a large value in the beginning of charging and zero at the end of charging. Thus the voltage across the emitter resistor 16 is small in the beginning of charging and increases with the progress of charging.

Figure 4A:
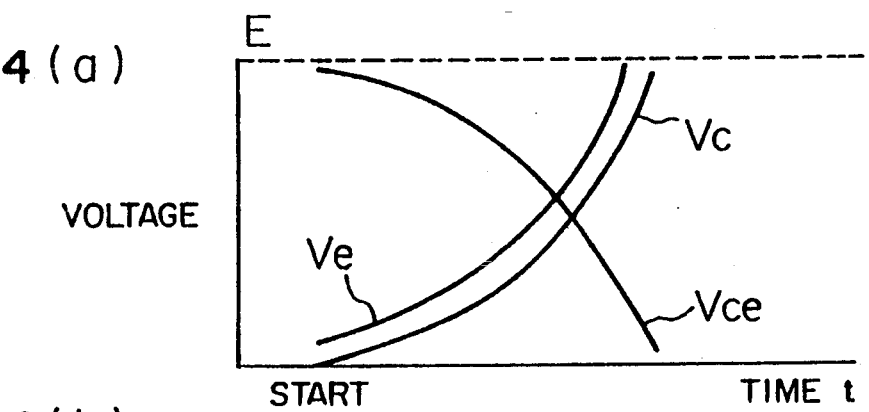
FIG. 4 shows the circuit operation according to the second embodiment of the invention, in which (a) shows the voltage change across a capacitor and a transistor, (b) the change in emitter current, and (c) the change in collector loss.
Figure 4B:
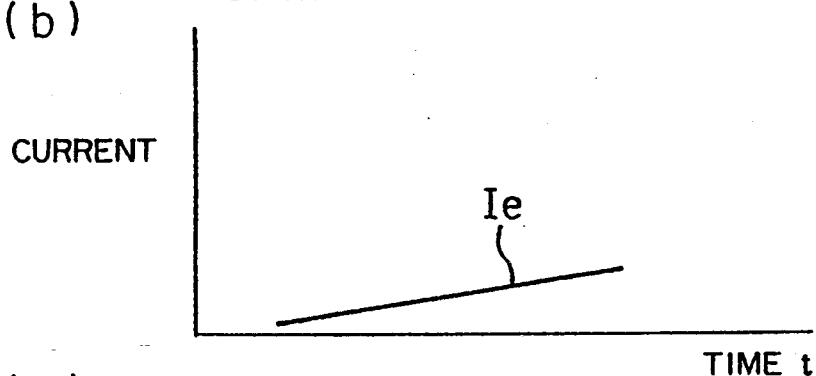
Figure 4C:
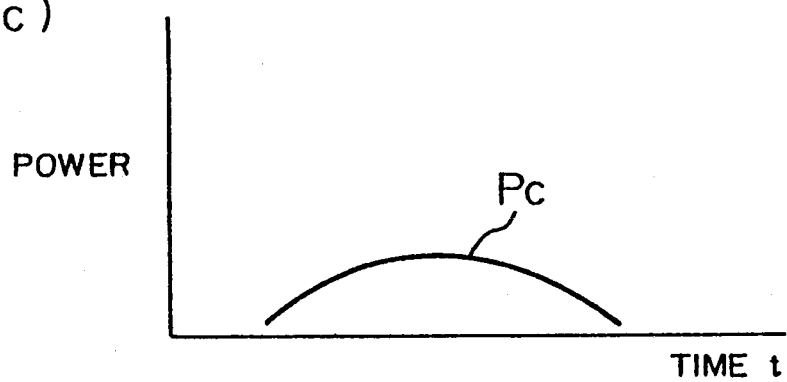
Figure 5A:
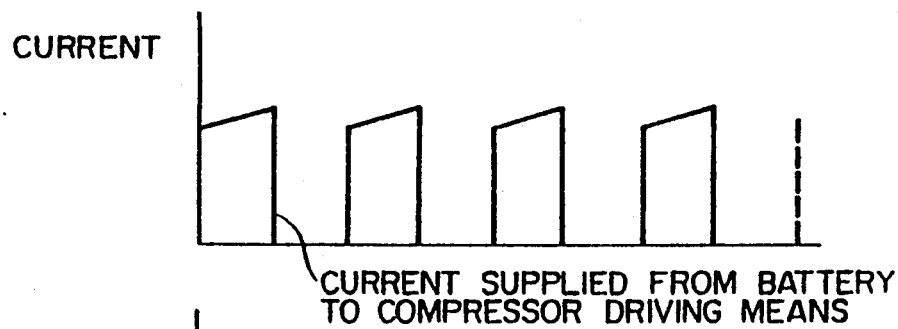
FIG. 5 is a diagram showing voltage and current waveforms at various parts of a common air-conditioning apparatus for the electric vehicle, in which (a) shows the waveform of current supplied from the battery to the electrically-operated compressor driving means, (b) the waveform of current supplied from the battery to the electrically-operated compressor with a capacitor connected, and (c) the waveform of a surge voltage due to the resonance.
Figure 5B:
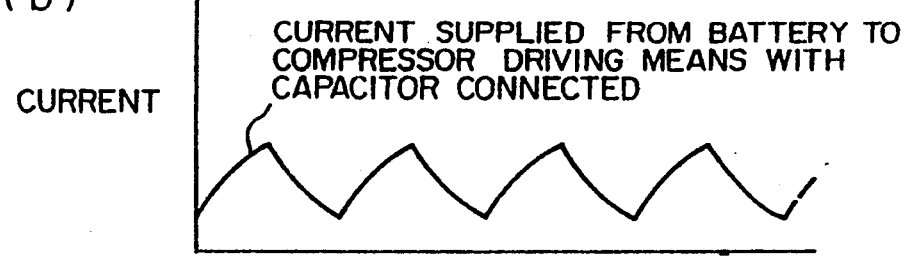
Figure 5C:
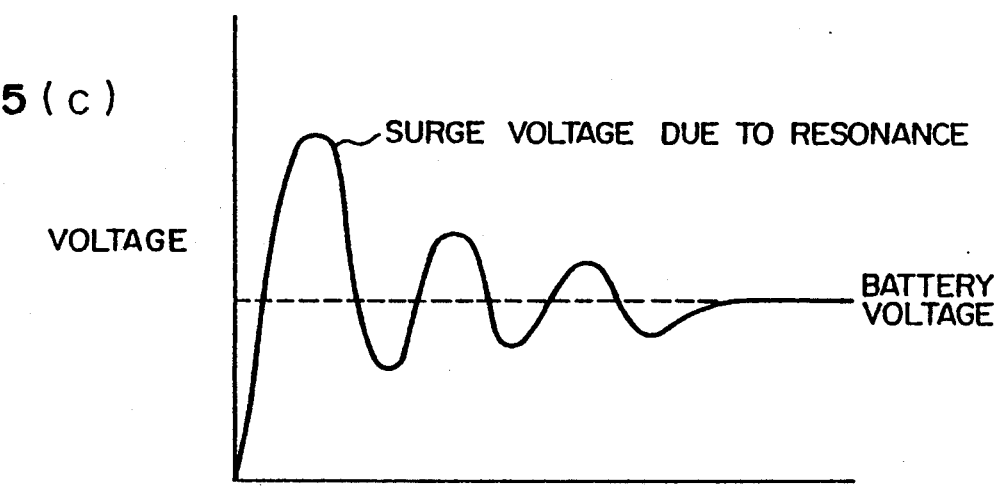

The circuit operation of the second embodiment of the invention is shown in FIG. 4. The emitter current Ie of the output transistor 9 assumes the voltage across the emitter resistor 16 divided by the resistance value of the emitter resistor 16. The voltage across the emitter resistor 16, on the other hand, is small in the beginning of charging operation and increases with the progress of charging. The emitter current Ie of the output transistor 9, therefore, assumes a small value in the beginning of charging operation and takes an increased value with the progress of charging. The voltage Vc across the capacitor 11 increases at an accelerated rate. The collector-emitter voltage Vce of the output transistor 9 is equal to the voltage E across the battery 2 minus the voltage Ec across the capacitor 11 further minus the difference between the zener voltage of the zener diode 12 and the base-emitter voltage of the output transistor 9. Since the difference between the zener voltage and the base-emitter voltage is a fixed value, the collector-emitter voltage Vce of the output transistor 9 decreases at an accelerated rate. The emitter voltage Ve of the output transistor 9 is equal to the sum of the voltage Vc across the capacitor 11 and the difference between the zener voltage and the base-emitter voltage. The collector loss Pc of the output transistor 9 is the product of the collector-emitter voltage Vce and the emitter current Ie. Since the collector-emitter voltage Vce decreases gradually while the emitter current Ie increases gradually, the product assumes a small value in the beginning and at the end and a larger value at the intermediate point. The collector loss Pc of the output transistor 9 is thus averaged out. The operation after charging is similar to that for the conventional circuit.

It is seen from the foregoing description that the maximum value of the emitter current Ie is the difference between the zener voltage of the zener diode 12 and the base-emitter voltage of the output transistor 9, divided by the resistance value of the emitter resistor 16 (the emitter-collector voltage of the control transistor 13 is substantially zero). The maximum value can therefore be set as desired by appropriately selecting the zener voltage of the zener diode 12 and the resistance value of the emitter resistor 16. Assuming that the zener voltage is 8 V and the resistance value of the emitter resistor 16 is 35 ohms (with the base-emitter voltage assumed to be 1 V), the maximum value is 0.2 A. Consequently, only a current of 0.2 A which is much smaller than 40 A flows from the time point of connecting the battery 2. Also, the power consumption of the emitter resistor 16 is at most 1.4 W, or an average of 0.7 W, which is much smaller than 60 W.

In the event of damage to the electrically-operated compressor driving means or the shorting of the capacitor or other minor troubles, the current is 0.2 A at maximum. Therefore, although the fuse fails to burn out, the collector loss Pc of the output transistor 9 is 15 W which is the product of 150 V and 0.1 A at maximum. As compared with the first embodiment of the invention, therefore, the collector loss Pc can be reduced while maintaining the same average emitter current Ie.

As a consequence, as seen from FIGS. 6C and 6D showing the shape of the transistor, the output transistor 9 can be cooled sufficiently if mounted on the heat sink 19 for the output section 18. Also, the small maximum current permits a small transistor to be usable, which transistor can be arranged on the printed board. As a result, a large space is not needed, and the air-conditioning apparatus is reduced in size. Further, the absence of wiring eliminates the work for fixing the wiring and facilitates the production. Furthermore, the conducting means of the same type can be used for a plurality of apparatuses since the maximum current value, which is determined regardless of the battery voltage, remains sufficiently small with the change in the electrostatic capacity of the capacitor 11.

Also, according to the first and second embodiments of the invention, if a switch is connected in series with the base resistor 14 for turning on and off the base current of the output transistor 9, the emitter current of the output transistor 9 can be turned on and off accordingly. As a consequence, at the time of damage to the electrically-operated compressor driving device, the shorting of the capacitor or minor troubles, it is possible to turn off the emitter current of the output transistor 9 by detecting the malfunction based on the conduction time of the emitter current. The base current is about 0.01 A, which is much smaller than the emitter current of 0.1 A, and therefore a large switching means is not needed. The conventional circuit, by contrast, requires the switching operation on 300 V, 40 A in maximum and hence a large switching means, which in turn requires a large space and considerable cost.

Although the switching means is a relay in the above-mentioned embodiment, a transistor, a thyristor or the like may be used alternatively. Also, various circuit configurations are possible in addition to those of the above-mentioned embodiments without departing from the scope and spirit of the invention.

As will be seen from the aforementioned embodiments, in the electric-vehicle air-conditioning apparatus according to one aspect of the invention, the conducting means charges the capacitor with a constant current. As a result, a constant current can be supplied regardless of the battery voltage or the electrostatic capacity of the capacitor. By setting the constant current to a small value, the charging surge current is avoided, and a constant current is maintained at the time of damage to the electrically-operated compressor driving device, the shorting of the capacitor or minor troubles. Thus the adverse effect on the reliability such as smoke is prevented in spite of the fuse failing to burn out. Common conducting means can thus be used for all battery voltages or electrostatic capacities of the capacitor.

Further, if the conducting means is composed of a semiconductor and the constant current is set to a small value, a small-sized semiconductor can be used, thereby making it possible to connect the conducting means directly on the printed circuit board in the electrically-operated compressor driving device.

The resulting absence of wiring eliminates the wire-fixing work for preventing damage to the wiring which otherwise might be caused by contact with a heat generating material or metal edge. Consequently, the conducting means is simplified in construction and the production is facilitated. Also, even when the capacitor is connected in reverse polarities, the puncture thereof is prevented. It is also possible to prevent the damage due to the increased source voltage of a switching power supply in parallel to the capacitor, thereby improving the reliability of the apparatus.

In the electric-vehicle air-conditioning apparatus according to a second aspect of the invention, the conducting means gradually increases the charge current to the capacitor. The charging surge current is therefore prevented. Also, if the maximum current is set to a small value, the current is maintained at a small level at the time of damage to the electric-vehicle compressor driving device, the shorting of the capacitor or minor troubles even though the fuse fails to burn out, thereby preventing such adversities as smoke which otherwise might adversely affect the reliability.

Further, the conducting means is supplied with the substantially full battery voltage at the time of charging start. Since the charging current is small, however, both power consumption and heat generation of the conducting means are small. The subsequent voltage drop and current rise averages out the power consumption and heat generation of the conducting means without any great variations. As a result, the heat radiator of the conducting means can be reduced in size and a small current rating of the devices serves the intended purposes, thereby reducing the size and cost of the apparatus.

Further, if the conducting means is composed of a semiconductor and the maximum current is set to a small value, a small-sized semiconductor is usable, thereby making it possible to connect the conducting means directly on the printed circuit board in the electrically-operated compressor driving device. Also, a large space is not required, and the air-conditioning apparatus can be reduced in size.

Furthermore, since the wiring is not required, the wire-fixing work for preventing the damage to the wiring which otherwise might occur by contact with a heat generating material or a metal edge is eliminated. The conducting means is thus simplified in construction and becomes easy to fabricate. Also, even when the capacitor is connected in reverse polarities, the puncture thereof is prevented. The damage to the apparatus which otherwise might be caused by an increased source voltage of the switching power supply connected in parallel to the capacitor is prevented, thereby improving the reliability of the apparatus.

In the electric-vehicle air-conditioning apparatus according to the present invention, in the event of a malfunction such as when the electrically-operated compressor driving device is damaged or the capacitor is shorted, the abnormality is detected from the conduction time of the emitter current to turn off the emitter current of the output transistor 9. The base current is smaller than a small emitter current, and therefore a large switch is not required.

We claim:

1. An electric-vehicle air-conditioning apparatus comprising:
   a battery having a first terminal and a second terminal;
   conducting means having an input terminal connected to the first terminal of the battery and an output terminal and for generating a constant current from the output terminal when a voltage between the input and output terminals is larger than a predetermined value;
   switching means connected in parallel to the conducting means and for shorting the input and output terminals of the conducting means in accordance with a control signal;

a capacitor connected between the output terminal of the conducting means and the second terminal of the battery and charged from the battery through the conducting means; and means for driving an electrically-operated air-conditioning compressor, including first means connected in parallel to the capacitor and for detecting the voltage across the capacitor to produce the control signal for causing the switching means to short when the detected voltage is larger than a predetermined value, and second means for driving the electrically-operated air-conditioning compressor by use of electric power supplied from the battery through the switching means.

2. An electric-vehicle air-conditioning apparatus comprising:

a battery having a first terminal and a second terminal;

conducting means having an input terminal connected to the first terminal of the battery and an output terminal and for generating a current from the output terminal when a voltage between the input and output terminals is larger than a first predetermined value, said conducting means further including means for increasing the current until the voltage between the input and output terminals decreases to a second predetermined value;

switching means connected in parallel to said conducting means and for shorting the input and output terminals of the conducting means in accordance with a control signal;

a capacitor connected between the output terminal of the conducting means and the second terminal of the battery and charged from the battery through the conducting means; and means for driving an electrically-operated air-conditioning compressor, including first means connected in parallel to the capacitor and for detecting the voltage across the capacitor to produce the control signal for causing the switching means to short when the detected voltage is larger than a predetermined value, and second means for driving the electrically-operated air-conditioning compressor by use of electric power supplied from the battery through the switching means.

* * * * *